United States Patent
Rackley, III et al.

(10) Patent No.: US 10,521,848 B2
(45) Date of Patent: Dec. 31, 2019

(54) LEARNING AGENT THAT FACILITATES THE EXECUTION OF A SUBSCRIPTION VEHICLE SERVICE BY DYNAMICALLY GENERATING MESSAGES AND PROCESSING RESPONSES TO GENERATE AND AUGMENT DATA THAT CAN THEN BE USED IN SUGGESTIONS TO CUSTOMERS

(71) Applicant: CLUTCH TECHNOLOGIES, LLC, Atlanta, GA (US)

(72) Inventors: Brady L Rackley, III, Atlanta, GA (US); James F. Heller, Atlanta, GA (US); David W. Hallum, Atlanta, GA (US); Ashish Trehan, Atlanta, GA (US); Kyle L. Clements, Atlanta, GA (US); John R. Phelps, Jr., Atlanta, GA (US); Adam J. Carley, Sandy Springs, GA (US); Vincent G. Zappa, Atlanta, GA (US); Steven S. Neel, Suwanee, GA (US); Sangameswar Venkatraman, Atlanta, GA (US); Benjamin E. Morgan, Doraville, GA (US); Eric R. Kraar, Atlanta, GA (US); Christopher M. L. Howie, Atlanta, GA (US)

(73) Assignee: CLUTCH TECHNOLOGIES, LLC, Atlanta, GA (US)

(*) Notice: Subject to any disclaimer, the term of this patent is extended or adjusted under 35 U.S.C. 154(b) by 259 days.

(21) Appl. No.: 15/267,150

(22) Filed: Sep. 16, 2016

(65) Prior Publication Data

US 2017/0004561 A1 Jan. 5, 2017

Related U.S. Application Data

(63) Continuation-in-part of application No. 14/847,881, filed on Sep. 8, 2015, now abandoned.

(60) Provisional application No. 62/046,813, filed on Sep. 5, 2014.

(51) Int. Cl.
*G06Q 30/06* (2012.01)
*G06N 20/00* (2019.01)

(52) U.S. Cl.
CPC ......... *G06Q 30/0631* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,424,997 B1 * | 7/2002 | Buskirk, Jr. | G06F 17/27 709/201 |
| 6,718,368 B1 * | 4/2004 | Ayyadurai | H04L 51/12 704/1 |
| 8,918,468 B1 * | 12/2014 | Fisher | H04M 3/5191 709/206 |

(Continued)

*Primary Examiner* — Dennis W Ruhl
(74) *Attorney, Agent, or Firm* — Smith Tempel Blaha LLC; Gregory Scott Smith; Matthew T. Hoots (57) ABSTRACT

A system and method to generate and maintain interaction with a customer by evaluating customer initiated messages and telematics data to obtain information used to generate response messages and, further, generating conversation initiating messages autonomously in an effort to solicit response messages from a customer.

20 Claims, 6 Drawing Sheets

(56) References Cited

U.S. PATENT DOCUMENTS

| | | | |
|---|---|---|---|
| 9,143,907 B1 * | 9/2015 | Caldwell | H04W 4/14 |
| 9,268,765 B1 * | 2/2016 | Rose Charvet | G06F 17/274 |
| 9,398,152 B2 * | 7/2016 | Christensen | H04L 51/04 |
| 9,813,363 B1 * | 11/2017 | Caldwell | H04L 51/02 |
| 2007/0198311 A1 * | 8/2007 | Menendez | G06Q 10/02 |
| | | | 705/5 |
| 2014/0237383 A1 * | 8/2014 | Kirshenboim | H04L 51/18 |
| | | | 715/752 |

* cited by examiner

LEARNING AGENT THAT FACILITATES THE EXECUTION OF A SUBSCRIPTION VEHICLE SERVICE BY DYNAMICALLY GENERATING MESSAGES AND PROCESSING RESPONSES TO GENERATE AND AUGMENT DATA THAT CAN THEN BE USED IN SUGGESTIONS TO CUSTOMERS

This application is a continuation-in-part of U.S. application Ser. No. 14/847,881 filed on Sep. 8, 2015, which application is incorporated herein in its entirety, and is related to and is being filed concurrently with the following United States applications for patent, each of which are herein incorporated by reference in their entirety:

Bearing the title of SYSTEM AND METHOD FOR SCORING THE FIT OF A VEHICLE FOR A GIVEN FLIP REQUEST, filed on Sep. 16, 2016 and assigned Ser. No. 15/267,144;

Bearing the title of LEARNING AGENT THAT FACILITATES THE EXECUTION OF A SUBSCRIPTION VEHICLE SERVICE BY IDENTIFYING VEHICLE SUGGESTIONS OR SUGGESTIONS THAT A CUSTOMER SWAP BASED ON DYNAMICALLY GATHERED INFORMATION, filed on Sep. 16, 2016 and assigned Ser. No. 15/267,145.

Bearing the title of SYSTEM AND METHOD FOR ALLOCATING VEHICLES ACROSS A POOL OF CUSTOMERS IN A SUBSCRIPTION VEHICLE SERVICE, filed on Sep. 16, 2016 and assigned Ser. No. 15/267,148.

BACKGROUND

The parent application to this disclosure addresses a need in the art for a system and a method of controlling risks, administering assets, scheduling operations, and providing highly personalized customer service for a service offering subscription vehicle access. As one of ordinary skill in the art would expect, a provider of a subscription vehicle service, as well as a client to a subscription vehicle service, may have a need for a artificially intelligent capability for identifying vehicle suggestions for customers.

Therefore, there is a need in the art for a system and method of dynamically obtaining and evaluating information in view of requests from customers and available vehicle fleet inventory to generate a vehicle suggestion list to be presented to a customer.

SUMMARY OF THE DISCLOSURE

Within the setting of a vehicle subscription service, customer demand, vehicle availability and the matching of customers with vehicles are balanced in view of the motivations of the service provider. Such motivations may also include a balance of various factors including profitability, customer satisfaction and efficiency. One aspect of the vehicle subscription service is the ability to interact with the customer to gather more volume of information as well as increased quality of information. The more accurately that the system can evaluate a customers needs, desires, motivations, etc., the more probable the system will be in creating customer satisfaction. Various embodiments of methods and systems for providing interaction with customers of a subscription vehicle service and analyzing responses in such interaction to augment data utilized in the determination of optimized vehicle suggestions to present to the user.

Initially, the subscription vehicle service presents new customers with a set of questions used to generate an initial profile. One of the purposes of the profile is to serve as a reference area that contains information about a user account and the users that are associated with that user account. Further, the information is utilized to either identify additional information that is needed or would be beneficial, initiate a campaign to obtain this additional information and/or present optimized suggestions or recommendations to a user in response to a vehicle request, such as obtaining an initial vehicle or performing a vehicle swap. Overall, one of the goals of the various embodiments of this invention is to provide a level of artificial intelligence that dynamically approaches an improvement in customer satisfaction in their use of the subscription vehicle service by analyzing tangible and quantifiable metrics obtained from the customer and/or through analysis of the profile.

Over the course of the relationship with the customer, the profile is dynamically updated based on a variety of factors and activities, including but not limited to further input from one or more users of the account when selecting a vehicle, actual driving characteristics of the one or more users, direct feedback from the users, aggregated information from other users not associated with the user account and interactions of the one or more users with the subscription service user interface, as non-limiting examples.

An engine, operating to provide the artificial intelligence, either autonomously or in response to a user request, analyzes the profile and the available domain of vehicles and then either provides one or more vehicle suggestions (or use case-based swap suggestions) to the customer or, initiates a campaign to collect further information to be analyzed prior to providing the one or more suggestions.

The present discloser presents further detail with regards to the process of applying artificial intelligence in identifying queries, probes, prompts or the like to solicit further information from customers or other sources, as well as processing the information received to properly classify and categorize the information so that it can be folded into already accumulated information in an attempt to provide a more accurate information base from which to identify vehicle suggestions. Thus, the present disclosure presents a system and method for engaging and conversing with members in the subscription vehicle service. It is believed that ongoing conversations with members of the subscription vehicle service will lead to deep and meaningful relationships between the service provider and the member. It should be appreciated that such relationships are vital, or even core to the ability to match the right member with the right vehicle at the right time and thus maximize customer satisfaction.

One exemplary embodiment comprises a method for a computer system to maintain a conversation or on-going communication with a customer in an effort to solicit and collect information in response to messages received from the customer. In the context of this disclosure, a conversation refers to natural language messages exchanged between the service provider and the member. The received messages may be customer initiated messages or customer messages in response to a prompt, inquiry or other message sent by the system. In either case, the message is analyzed to identify one or more business topics that the received message relates to and to identify key data elements in the message. It should also be appreciated that in addition to the received message, other information may also be analyzed at this time in identifying the business topics and key data elements. For instance, prior messages received, prior transactions, telematics data and information from other applications may also be examined to identify the business topics and key data elements. Based on the business topics and the key data elements, the method generates a response message to be sent to the customer. Prior to sending the response message, the message may be analyzed to generate a confidence score for the response message. It should be appreciated that the message may be sent prior to identifying the confidence score and then the message can be augmented or followed up if it is determined that the confidence score is too low. Further, it should be appreciated that the customer message may be just one message in a stream of messages or events. Thus, as the system processes the messages, it gains historical knowledge of actions taken in response to certain messages and trends.

If the confidence score is above a first threshold value, then the system may deliver the response to the customer. However, if the confidence score is below a second threshold value, the system may initiate a review of the response message and adjust the response message to have a higher confidence score and then deliver the response to the customer.

The response message may be generated by selecting one or more canned messages, message templates or message components from a set of messages/templates/components that are related to the business topic and one or more of the identified key data elements. For the templates, the messages may be completed by information from a customer profile and/or by soliciting further information from the customer and/or by examining prior messages and/or examining prior transactions and/or by examining telematics data.

In addition, the system may operate to generate conversation initiation messages in a variety of manners. For instance, such messages may be initiated based on telematics data received from a vehicle being driven by a customer, after a threshold period of time of not receiving a customer message, in response to a change in the fleet, in response to requests from other customers for particular vehicles, etc.

These and other features and aspects are presented in greater detail in the drawings and the detailed description.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. The specific letter character designation "N" or "n" is meant to indicate that the particular element is not limited to any specific quantity. Letter character designations for reference numerals may be omitted when it is intended that a reference numeral to encompass all parts having the same reference numeral in all Figures.

DETAILED DESCRIPTION

This disclosure presents embodiments, as well as features, aspects, functionality, etc., of a technique for obtaining quality information from a customer of a subscription vehicle service through actively the customer in an ongoing conversation. A key element is maintaining information solicitation and flow. As such, each communication initiation from a customer is evaluated to determine if it is coherent with what is known about the customer and if it can be leveraged to obtain further information. In addition, the system can actively initiate and maintain conversations with a customer in an effort to gather further and more accurate information. Overall, other aspects and operations of a subscription vehicle service can be benefited by the efforts and results of the presently disclosed system and method.

More specifically, the system and method presented in this disclosure seeks to take advantage of all interactions between a customer and the subscription vehicle service, as well as the occurrence of other events and activities, to continue a probe into the mindset of the customer to gather more intelligence about the customer and to improve on the level of intimacy between the customer and the subscription vehicle service. For instance, during the initial profile generation phase, the vehicle subscription service may continue to analyze response to queries that the system sent to a customer in order to generate further queries. In addition, internal events such as a system rejection of one or more vehicles in a suggestion list, or a rejection of a vehicle suggestion by a customer, or a change in vehicle fleet status, etc. may be used to launch the system into an information gathering mode. Further, information received from a customer can be analyzed in view of the present knowledge of that customer to determine if the information appears consistent, close or is substantially deviating from the systems knowledge of the customer.

The present disclosure focuses on inventive techniques for performing the afore-mentioned objectives and thus, to increase the value of the information within the subscription vehicle service system such that the objections of the service can be more readily attained.

Definitions

The term "exemplary" is used herein to mean serving as an example, instance, or illustration. Any aspect described herein as "exemplary" is not necessarily to be construed as preferred or advantageous over other aspects.

The term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may include files having executable content, such as: object code, scripts, byte code, markup language files, and patches. In addition, "content" referred to herein, may also include files that are not executable in nature, such as documents that may need to be opened or other data files that need to be accessed.

The terms "component," "database," "module", service," "system," and the like are intended to refer to a computer-related entity, either hardware, firmware, a combination of hardware and software, software, or software in execution.

For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

A "subscription" is an account with the service. A "subscriber" or "client" is a named person who has entered into a contract for service and is listed on the account. A "driver" or "named driver" is a person that has been approved by the service to drive one or more vehicles associated with the account on a habitual basis or for an extended period of time. A subscription may have multiple drivers listed on the account. A subscription account may have one or more vehicles assigned to it at any period in time. Each driver may be approved to drive one, some or all of the vehicles assigned to the account.

A "predictive feature" or "feature" is defined as, in the practice of machine learning and pattern recognition, an individual measurable property of a phenomenon being observed. Choosing informative, discriminating and independent features may be a crucial step for effective algorithms in pattern recognition, classification and regression. Features are usually numeric, but structural features such as strings and graphs are used in syntactic pattern recognition. The concept of a "feature" is related to that of a "dependent variable" (or "explanatory variable") used in statistical techniques such as linear regression.

The term "possession" is used herein to denote the period of time when a vehicle is assigned to a subscriber or client and is in the custodianship of that subscriber or client. This concept is distinct from "rental" for at least the reason that when a vehicle is rented, the amount paid is a function of the time that the subscriber has the car. Under a subscription service, the payment may comprise a flat fee that does not depend on either the duration of possessions or the frequency of swaps.

The present disclosure, which should be viewed with reference to the above-incorporated parent and related applications, generally relates to a system for and a method of analyzing currently available information to identify further information or information voids, identifying mechanisms to solicit the further information and then analyzing the received information to augment the currently available information.

Figure 1:
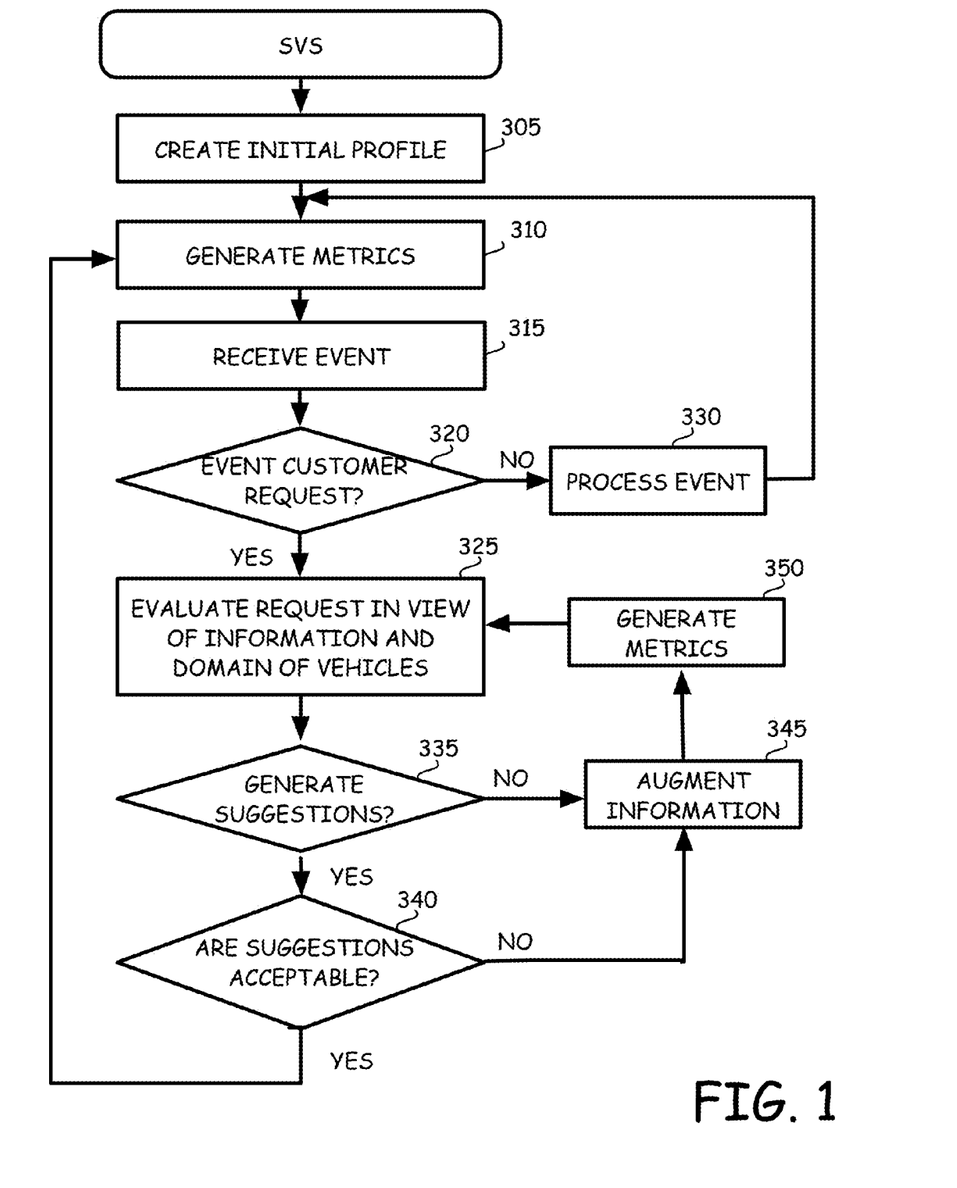
FIG. 1 is a high-level flow diagram illustrating an exemplary process for the dynamic information based subscription vehicle service.

FIG. 1 is a high-level flow diagram illustrating an exemplary process for the dynamic information based subscription vehicle service. Initially, a profile is created 305. Generally, when a new customer subscribes to the subscription vehicle service, the new customer may be presented with a set of questions about a variety of topics, preference selections or other information gathering techniques. Alternatively or in addition to, other information sources can be accessed, queried, scraped, etc. to obtain some or all of the desired information. The information collected may include, as non-limiting examples: household demographics; lifestyle; personality characteristics (likes, dislikes and elements to which they are indifferent or agnostic); driving styles, characteristics, strengths, weaknesses and habits; vehicle requirements, desires or interests; commuting demographics (daily, monthly, annually etc.); storage requirements (garage size, parking deck restrictions) and income ranges as a few non-limiting examples. This information can be collected during the sign-up process or, portions or all of the information can be collected or provided at a later time. The customer can enter this information through an Internet browser, mobile smart phone, tablet, etc. that the customer is using to access the subscription vehicle service system ("SVS"), or through a downloaded or a resident application that accesses the SVS from a mobile device or computing system. The SVS is a computing environment that houses and runs the subscription vehicle service. The SVS receives the information from the customer and populates a profile that houses the information about the account and the users that are associated with the account.

The SVS accesses the information that is incorporated into the profile and generates metrics 310. Among other things, the metrics include value attributes for various categories of information and use cases. The value attributes can best be understood by way of example. As a non-limiting example, if a customer does not provide a vehicle color preference, the value attribute for the color of a suggested vehicle may be low or zero. As another non-limiting example, if the household demographics indicate that the customer has a large family, such as a spouse and 3 kids, the value attribute for vehicles with seating availability of 5 or more passengers may have a high value. Further, it should be appreciated that the attribute values may be multifaceted and taking several parameters into consideration. As a non-limiting example, suppose a customer has a large family and also owns a minivan. A value attribute for lower occupancy capacity may be set to a high value for vehicle requests that are directed towards daily work commutes but, for a lower value for requests that are directed towards weekend travels. It should be appreciated that a seemingly endless number of metrics could be considered in various implementations of the SVS, and that the SVS incorporates artificial intelligence, at least in the forms of heuristics, rules and algorithms, as well as data and parameters (all collectively referred to as "rules and data"), to dynamically identify and create various value attributes as the information available expands, contracts and changes. Further, it will be appreciated that the value attributes operate to define the profile information in terms of factors such as specificity, fit with actual and/or recent behavior, and that try to quantify normally intangible aspects of the customer's relationships with the SVS such as the customer's level of trust, desire for control and satisfaction. Thus the value attributes can include a canned number of common value attributes, such as the non-limiting example in TABLE 1.

TABLE 1

Example of Attribute and Assigned Values

| Attribute | Profile Information | Value Attribute |
|---|---|---|
| Color | White, black, tan | 80 |
| Number of doors | 4 | 100 |
| 0 to 60 rating | — | 50 |
| Occupancy | 5 | 100 |
| Safety rating | Highest | 90 |
| Fuel Efficiency | Minimum of 20 mpg | 90 |
| Handless entry | Yes | 90 |
| Storage capacity | High level | 90 |
| Rear seat DVD displays | Required | 100 |
| Convertible | No | 0 |
| Moon roof | — | 50 |
| Automatic | Yes | 100 |
| Manual | No | 0 |
| Blue Tooth Equipped | Yes | 90 |

TABLE 1 presents a simple sub-set of potential attributes and an exemplary set of information that could be present in a particular profile in view of the attributes. The process of generating the metrics 310 then applies heuristics and algorithms to associate a weighting factor with each of the attributes based on the profile information to create the value attributes with a value of 0 to 100 in the illustrated example where 0 is no value and 100 is the maximum value.

It should be appreciated that each customer may have multiple profiles for differing requests, such as a recreational profile and a professional profile.

As those skilled in the art will understand, a use case describes the behavior of the SVS as it responds to a series of related requests from a customer. The SVS generates the initial use cases based on the information received and as the information is expanded, contracted or modified, the SVS modifies and updates the use cases. As a non-limiting example of a use case, in response to a request from a customer for a vehicle, a use case may take into consideration the specific parameters of the request in view of the value attributes and other ancillary information to generate a response to the request. As is further discussed below, the response may include one or more vehicle suggestions and/or requests to the customer or other sources for additional information. Thus, in one specific example, a customer may request a vehicle for a trip to Panama City Beach Fla. for the period of time from Apr. 1 to Apr. 8, 2016. A use case may be set up to activate a trigger that indicates the requested time period coincides with the spring break for the customers children based on requests from prior years, calendar information of the customer, data mined from the website for the school system in which the customer's children are enrolled, etc. In addition, the use case may take into consideration the various value attributes of the customer and then generate a request for further information if needed. Thus, as previously mentioned, a customer may have multiple profiles but, a use case can be utilized to create the essence of multiple profiles by pooling only particular attributes from the profile information.

The SVS may include a list of use cases that serve as a pool of available use cases. As the profile information is entered and augmented, particular use cases based on the profile information can be selected for the particular profile. Additional use cases can be added to the SVS in the future, either by an operator or by being dynamically generated based on profile information of an individual, multiple customers, identified trending, etc.

In addition or alternatively, the system may initiate an information campaign to collect further information. As a non-limiting example, the SVS may send a text to the customer to confirm that the customer is taking his or her family on a spring break vacation. Further, the use cases within the profile for each customer can be displayed as a set of options through which this customer can request a swop within the SVS, such as through a mobile app. For each option the customer interface may be used to display additional details designed to convey the essence of the option (e.g. intended use case) and selected criteria that can be used for assigning a vehicle if the option is chosen (e.g. number of seats, amount of luggage). The customer interface can allow the customer to browse and select an option. When selecting an option, the customer may choose to provide additional information. Such additional information can be provided through the entry of free form text, drop down menu selection, radial button selection etc., and the information may augment or correct the details that are current presented to the customer. The customer interface may also include the ability for the customer to request a new option and describe their needs via any of a variety of input mechanisms. After selecting an option, the customer may input their desired date, time and location to receive a vehicle and submit their request. In other embodiments, the customer may request a swap via a messaging medium such as SMS, a messaging client within the SVS mobile app, or via a third party messaging app or even email, voice messaging etc. In such embodiment, the customer may reference one of the options described in the customer interface or otherwise just describe what they need using free form text.

Having a general understanding of the value attributes and use cases of the SVS, the additional processes in the flow diagram of FIG. 1 can be explored. Once the initial value attributes and use cases are generated, the SVS is armed and ready to receive and respond to an event 315. An event may take on a variety of forms and be initiated by a variety of sources or circumstances. As non-limiting examples and event may include a vehicle request from a customer, an update on the domain of available vehicles in the fleet, an alert regarding the status of a vehicle in the fleet, or simply an update of information that is generated or made available from an external source and that may have an impact on the general operation of the SVS, such as requiring an update of use cases across the SVS system or, may simply be pertinent to a subset of the SVS accounts or even a single account.

When an event is received, the SVS may operate to evaluate the type of event and respond accordingly 320. For example, if the event is a customer request, the SVS continues by evaluating the request in view of information already of record and/or that is available to the SVS, and the domain of vehicles available in the fleet 325. However, if the event is not a customer request, the event is further processed 330 and the metrics are regenerated 310 based on the results of the event.

Events that are customer requests can include, but are not limited to, the form of a vehicle swap request, an initial request if the customer does not have a vehicle currently or a vehicle return/pick-up request. When the event is a customer request, once the request is evaluated 325 the SVS determines if one or more vehicle suggestions 335 are to be generated.

If the event request is a customer request for a vehicle or a swap 320, the SVS evaluates the request in view of the currently available information and the domain of vehicles available or soon to be available 325. For example, the evaluation of the customer request can include analyzing the customer request in view of the currently defined use cases.

If the request matches up with a user case, then the system may move forward with the evaluation and/or move towards generating suggestions. However, if the request does not match up with one of the defined use cases, the defined use cases can be evaluated to identify a "best match" for the customer request. The "best match" determination could be made on a variety of criteria as previously described and as presented in more detail herein. If it is determined that there are no use cases that are sufficiently comparable with the customer request, then the system may operate to create a new use case such as by augmenting the information 345 and regenerate the metrics 350 before further analyzing the customer request 325.

If it is determined that sufficient information exists to generate suggestions 335, the vehicle suggestions are generated. It is then determined if the vehicle generations are acceptable. The suggestions may be rejected by the customer or by the system. In either case, the information is augmented and the metrics are regenerated. If a suggestion is accepted, processing continues by generating the metrics again based on this recently accepted suggestion.

Returning to decision block 320, if the event is a request for more information, then the event is processed 330. Similarly, if it is determined that insufficient information exist to generate suggestions or if the suggestions are rejected, the information is augmented 345. The information augmentation and the information request events both operate to gather further information to bolster the information base. This process is the main focus of this disclosure. However, it should be appreciated that the information augmentation and the information request events may alternatively or in addition to, operate to suggest a swap or flip.

The present disclosure provides a more granular level of information relative to its sister applications that focus on the gathering of information and the generation of vehicle suggestions based on such information. The present disclosure presents a more focused view on techniques to maintain a "conversation" with a customer and how information is extracted from various message streams, such as from text messages. The information gathered from the described process is used to feed the metric generator.

Figure 2:
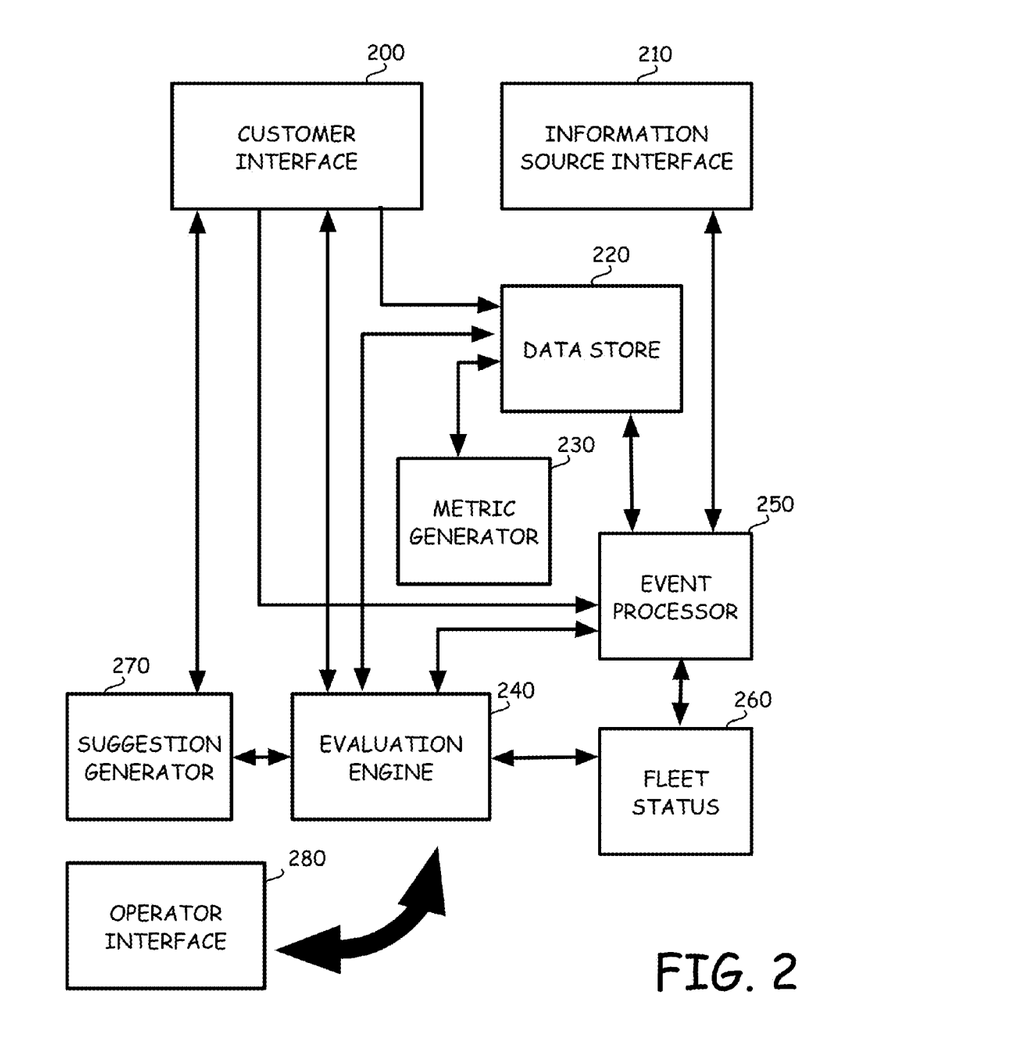
FIG. 2 is a block diagram illustrating functional operations of an exemplary embodiment of the SVS.

FIG. 2 is a block diagram illustrating functional operations of an exemplary embodiment of the SVS. It should be appreciated that the particular breakdown of the various functional blocks is only provided for an overall functional understanding of an exemplary embodiment and is not intended to illustrate an actual structural or architectural restriction on various implementations. For instance, the functionality in one illustrated block may actually be performed or implemented by multiple systems that are geographically dispersed, multiple modules in the same computing system, or multiple software flows in the same executable software element. In addition, functionality that is illustrated in separate blocks may actually be incorporated into the same software or hardware module. Thus, those skilled in the art will appreciate that the presented structure is simply provided to assist in the understanding of the overall functionality of an exemplary embodiment. Details related to FIG. 2 are provided in the above-incorporated by reference application and the reader is directed to that application for the details. As such, this application will simply provide an overview of the functional operations and then focus on the event processor 250 and establishing and running campaigns.

The functional block diagram illustrates a customer interface 200 and an information source interface 210 to obtain information for the data store 220 and metric generator, as well as to solicit further information. The data store 220 is utilized as a database or storage medium for information that is acquired and/or utilized by the SVS. Periodically, the SVS will generate metrics as described in FIG. 1 for the metric generating events 310 and 350. The metric generator 230 receives input from the data store 220 and other sources in support of generating the metrics. The operator interface 280 may include a terminal access to the SVS, Internet access, mobile access through a browser or a resident app, messaging, etc. The evaluation engine 240 primarily analyzes the available data to provide input to the suggestion generator 270 and/or generate events for the event processor 250. The suggestion generator 270 responds to input from the evaluation engine 240 to identify vehicles that match the customer's vehicle request in view of the customer request and the information acquired as well as the value attributes etc.

The event processor 250 operates to receive and interpret various events that may be received by or occur in the SVS. The event processor 250 may receive events directly from the customer interface 200, such as a vehicle swap request, feedback, queries regarding vehicle availability, etc. In addition, the event processor may receive events that are triggered by the metric generator 220, the evaluation engine 240, the fleet status 260, the information source interface 210, the operator interface 280 or any other source or generator of an event in the SVS that needs to be processed. If an event received by the event processor 250 is a request for a vehicle or a vehicle swap, the event processor 250 can operate to trigger the evaluation engine 240 to generate a vehicle suggestion list (see processes 320 and 325 of FIG. 1). If the evaluation engine 240 determines that additional information is required or that additional information may be useful to generate a more optimum vehicle suggestion list, the evaluation engine 240 may trigger a campaign event for obtaining such further information by invoking such an event. The event processor 250 would operate on this event in any of the variety of manners describe in connection with processes 330 and 345 of FIG. 1. The fleet status may also result in triggering various types of events. For instance, as an operator updates the SVS through the operator interface 280, the operator can enter changes to the fleet, such as the addition of new vehicles, removing of sold assets or tagging assets as unavailable due to delivery or maintenance, etc. This information may then result in the generation of events to collect more information, modify information, regenerate metrics, etc.

One of the goals of the SVS system is to continuously attempt to gather further useful information to further refine the overall operation to obtain an optimal level of customer satisfaction and profitability for the SVS operator or owner. One technique employed in the various embodiments is to maintain an ongoing data acquisition process. One mechanism to maintain this ongoing data acquisition process is to engage in a "conversation" with the customers. A conversation, as defined herein is an interaction between the customer and the SVS in which data is solicited and exchanged. The customer can be the target of the conversation and, the customer may interact with algorithms, heuristics and processes running in the SVS, as well as the operator of the SVS or other workers. As the interaction continues, further information is obtained to build up the knowledge base regarding the customer. Thus, the conversation within the context of the various embodiments can include natural language messages exchange between components, operators and workers associated with the SVS and the customers. The messages may be exchanged over a variety of channels, including but not limited to email, SMS, mobile app messaging, mobile push notifications, voice applications, social media messaging applications, phone calls, and in-person exchanges as a few non-limiting examples.

The operation of the SVS in view of these on-going conversations server at least two important functions. First of all, the SVS seeks to initiation a conversation or keep a current conversation active with information flowing into the system. Second, the system operates to optimize the handling of messages from customers by processing the message to optimize routing and handling. The operation of the SVS in view of these functions is presented in greater detail below in connection with FIGS. 5-7.

Figure 3:
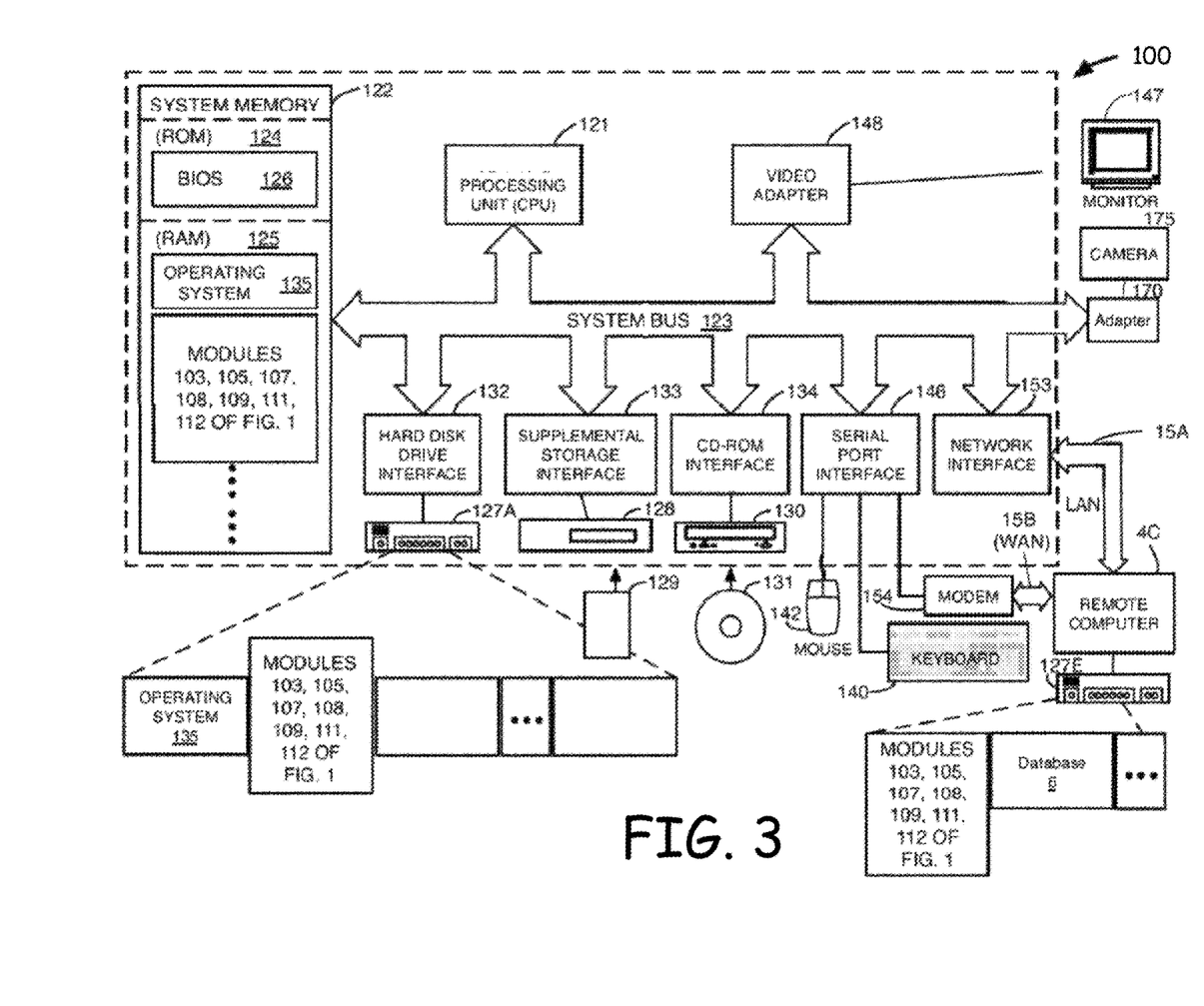
FIG. 3 is a functional block diagram of one exemplary embodiment of a computing system that may form one of the system components of the SVS.

FIG. 3 is a functional block diagram of one exemplary embodiment of a computing system that may form one of the system components of the SVS. The illustrated system, as well as each of the components may be a physical machine in a physical environment or a virtual machine instance running in a virtual private cloud provided by a commercial cloud-computing provider, associated with any component of the system of the present disclosure. One of ordinary skill in the art understands that the written description associated with FIG. 3 may be applicable to any system component described as running system content, applications, tiers, programs, process flows, methods, etc. For example, one of ordinary skill in the art will recognize that the SVS in combination with the computing system of FIG. 3 may support a virtualized environment. That is, the SVS may execute the software of this disclosure in a virtualized environment where a virtual machine is running on a hypervisor that is supported across a number of physical machines. However, other configurations besides the virtualized environment are possible and are included within the scope of this disclosure.

Referring again to FIG. 3, the computing system, or server 100, may comprise a processing unit 121, a system memory 122, and a system bus 123 that couples various system components including the system memory 122 to the processing unit 121. The system bus 123 may comprise any of several types of bus structures including a memory bus or memory controller, a peripheral bus, and a local bus using any of a variety of bus architectures. The system memory may comprises a read-only memory (ROM) 124 and a random access memory (RAM) 125. A basic input/output system (BIOS) 126, containing the basic routines that help to transfer information between elements within computer 120, such as during start-up, is stored in ROM 124.

The server 100 may comprise a hard disk drive 127A for reading from and writing to a hard disk, not shown, a supplemental storage drive for reading from or writing to a removable supplemental storage 129 (like flash memory and/or a USB drive) and an optical disk drive 130 for reading from or writing to a removable optical disk 131 such as a CD-ROM or other optical media. Hard disk drive 127A, magnetic disk drive 128, and optical disk drive 130 are illustrated as being connected to system bus 123 by a hard disk drive interface 132, a supplemental storage drive interface 133, and an optical disk drive interface 134, respectively.

Although the exemplary environment described herein is illustrated as employing hard disk 127A, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet-connected devices such as in a portable devices and/or personal digital assistants (PDAs).

The drives and their associated computer readable media provide nonvolatile storage of computer-executable instructions, data structures, program modules, and other data for computer or client devices. A number of program modules may be stored on hard disk 127, magnetic disk 129, optical disk 131, ROM 124, or RAM 125, including, but not limited to, an operating system 135 as well as various modules and routines as presented in FIG. 2, as well as the various heuristics, algorithms and data. Program modules comprise routines, sub-routines, programs, extendable objects, components, data structures, etc., which perform particular tasks or implement particular abstract data types. Aspects of the present invention may be implemented in the form of a downloadable, client-side, application modules, which are executed by server 100 in order to provide the functionality described herein.

A user may enter commands and information into server 100 through input devices, such as a keyboard 140 and a pointing device 142. Pointing devices may comprise a mouse, a trackball, and an electronic pen that may be used in conjunction with an electronic tablet. Other input devices (not shown) may comprise a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), wireless interface such as WIFI or BlueTooth, or the like. Likewise, the user can enter commands through a browser type interface running on a separate computer, laptop, handheld device, etc., that connects to the server 100 through a LAN 15A, WAN 15B or other interface.

The display monitor 147 may also be connected to system bus 123 via an interface, such as a video adapter 148. The display 147 may comprise any type of display devices such as a liquid crystal display (LCD), a plasma display, an organic light-emitting diode (OLEO) display, and a cathode ray tube (CRT) display.

A camera 175 may also be connected to system bus 123 via an interface, such as an adapter 170. The camera 175 may comprise a video camera such as a webcam. The camera 175 may comprise a CCD (charge-coupled device) camera or a CMOS (complementary metal-oxide-semiconductor) camera. In addition to the monitor 147 and camera 175, other peripheral output devices (not shown), such as speakers and printers may also be communicatively coupled to the server 100.

Server 100 may operate in a networked environment using logical connections to one or more remote computers, such as a web server. A remote computer may comprise another personal computer, such as another server 4C, a portable computing device, a router, a network PC, a peer device, or other common network devices. While the web server 4C or a remote computer typically comprises many or all of the elements described above relative to the server 100, only a memory storage device 127E has been illustrated in FIG. 3. The logical connections depicted in FIG. 3 comprise a local area network (LAN) 15A and a wide area network (WAN) 158. Such networking environments are commonplace in offices, enterprise wide computer networks, intranets, and the Internet.

When used in a LAN networking environment, server 100 is often connected to the local area network 15A through a network interface or adapter 153. When used in a WAN networking environment, server 100 typically comprises a modem 154 or other means for establishing communications over WAN 158, such as the Internet. Modem 154, which may be internal or external, is connected to system bus 123 via serial port interface 146. In a networked environment, program modules depicted relative to the server 4C, or portions thereof, may be stored in the remote memory storage device 127E. It will be appreciated that the network connections shown are exemplary and other means of establishing a communications link between server 100 and other devices may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network (such as communications-network 15A, for example). In a distributed computing environment, program modules may be located in both local and remote memory storage devices.

In one exemplary embodiment, one or more extendable objects, applications, programs, system processes, method steps, etc. of the system of the present disclosure may be stored in the memory 112 as computer program instructions. In one exemplary embodiment related to the functional diagram of FIG. 2, the server 100 may execute, at least partially, one or more of the functional blocks.

Figure 4:
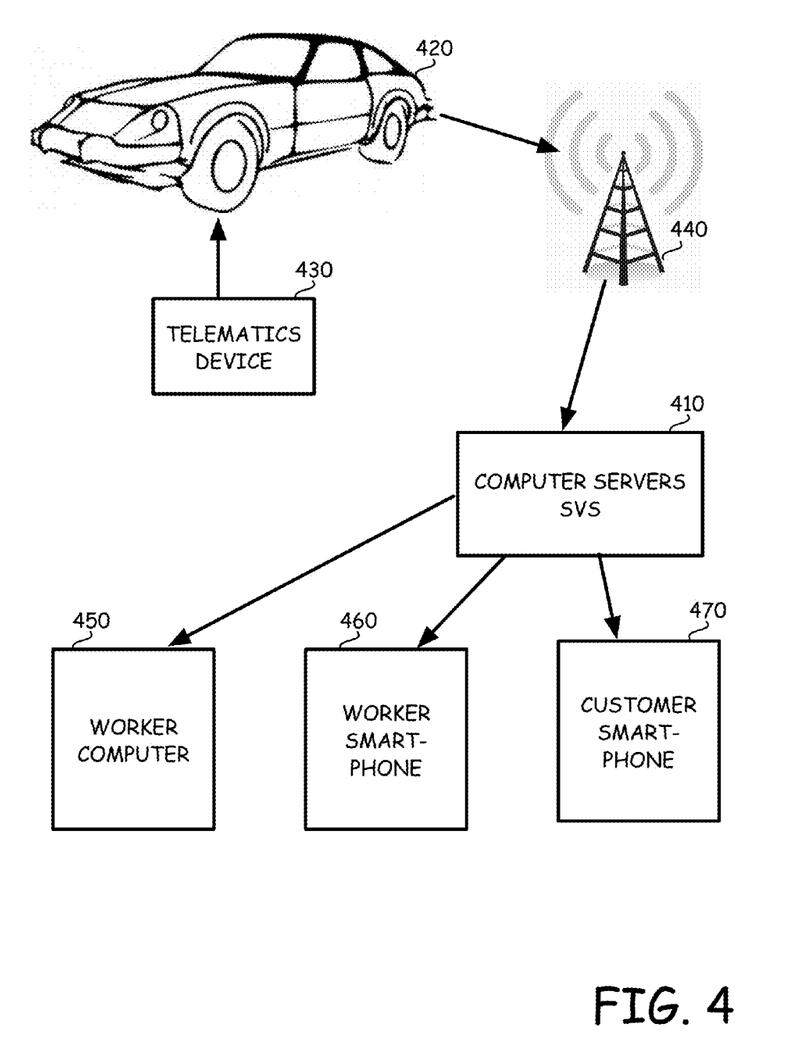
FIG. 4 is a block diagram illustrating an exemplary environment in which the SVS may operate.

FIG. 4 is a block diagram illustrating an exemplary environment in which the SVS may operate. The computer servers 410 house the main elements of the SVS as depicted in FIG. 2. The SVS interfaces with, solicits and obtains information from various sources. As a non-limiting example, a few of the sources of information are depicted in the environment illustrated in FIG. 4. The SVS 410 can gather information with regards to how a user operates a fleet vehicle 420. As illustrated, a telematics device 430 can be communicatively coupled to the fleet vehicle 420 to obtain such information. The information may be delivered to the SVS 410 through the cellular network 440, or by other means such as being stored on board and then retrieved when the fleet vehicle 420 is returned from a memory device, WIFI network, BlueTooth, etc.

Further, the SVS 410 interfaces to a operators and workers of the SVS that may be using a computer 450 and/or a smartphone device 460. Further, the SVS interfaces to the customer through a customer smartphone 470, as well as other customer devices such as tablets, computers, voice telephone calls, messaging services, etc. It should be appreciated that the SVS 410 can engage a customer in a conversation and, the operators and/or workers may also engage the customer in a conversation by interacting with the customer through the computer 450 and/or smartphone 460. Such conversations can be monitored by the SVS 410 to mine for further information. In addition, the SVS can monitor phone conversations and convert voice to text and mine the converted conversations for further information. Not illustrated directly in FIG. 4 but illustrated in FIG. 1, the SVS 410 can also monitor other systems and servers to gather information, such as social network sites, email inboxes and other sources that may be associated with the user.

Figure 5:
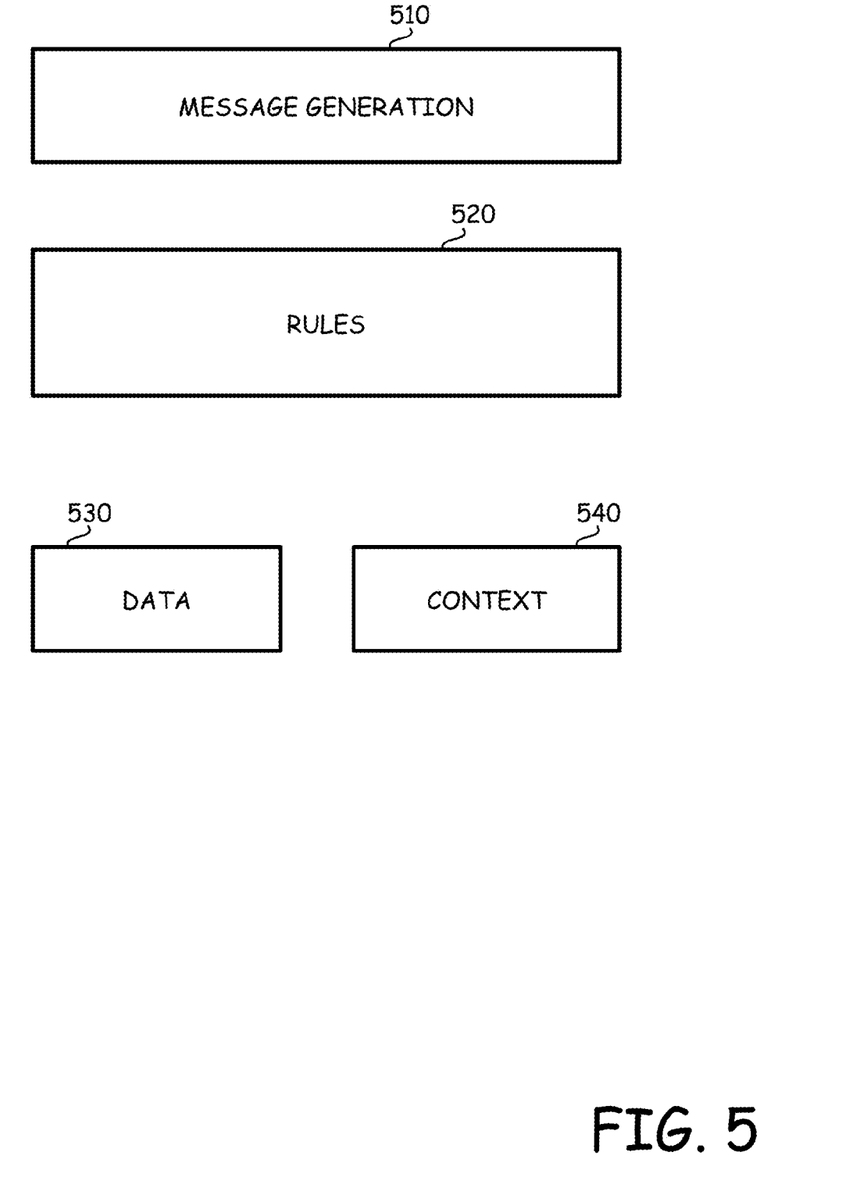
FIG. 5 is a block diagram illustrating the functional components of an exemplary event processor.

FIG. 5 is a block diagram illustrating the functional components of an exemplary event processor. As in any conversation, some force must keep the conversation going. Obviously customers share a level of the burden and will naturally take certain actions to initiate and maintain a conversation. However, the message generation 510 from SVS is designed to operate as another source for engaging a customer and maintaining a conversation. The data component 530 represents the domain of information that the SVS knows about a customer, a vehicle and every time a customer has driven a certain vehicle and the telematics associated with such events. Thus, the data component 530 includes, but is not limited to, the customer profile, the account profile, vehicle preferences, vehicle attributes, information about where and when a vehicle was driven, information about how a vehicle was driven, previous messaging interactions between the SVS system, historical actions of a customer, operators and workers and the customer, and results from predictive modeling of customer activity.

The context 540 refers to any information that is gather outside of the SVS system. Examples of context include, but are not limited to, weather, season, time of day, day of week, traffic, current regional events, results of sporting events, performance of financial markets, time of year and holidays as non-limiting examples.

The rules 520 may be constructed based on any element of data or context that is available to the SVS. A few non-limiting examples of exemplary rules may include:
When a customer has been in a vehicle for more than X days
When a customer takes a road trip and is on their way home
When the weather is in a particular state
When a customer has driven a vehicle X number of miles
When spring break is coming up and the customer has children [i.e. age range]
When valentine's day is near and the customer is married
When it is the customer's birthday
More complex rules may be represented as a state machine where a chained combination of data and context may build over time to represent a rule.

The rules may contain hints, suggestions or seeds (collectively "hints") for message generation 510. These hints may be comprised of a list of messages that the system could randomly select from or, it may be a more complex set of hints that can be used with natural language techniques to construct a response to a customer message or inquiry.

Message generation hints may include fields of the message to be personalized. The system can use attributes from the data to replace fields in the message hints with actual member data. Some simple, non-limiting examples may include the first name of the customer, the current vehicle, the name of the customer's spouse or children, events in the customer's calendar, etc.

After a message is generated, the delivery channel for the message is determined. The delivery channel may be specified in the rules, the data store, the customer's preferences and the current status of the customer (i.e., is the customer driving, within cellular range, at work, etc.) as a few non-limiting examples. The system can consider all of the sources and determine the appropriate channel(s) for the delivery at the current time or, schedule a delivery on a particular channel in future.

After the delivery channel ahs been determined, the message is scheduled for delivery. The system will select a delivery time by analyzing past member behavior that indicates the preferred time of contact for that particular channel. Further, the system can determine when the customer is most likely to respond. Schedule of delivery may also take into consideration the cost and expedience of the message delivery channel and time frame. For instance, if it is 6:30 AM and customer is driving, the system can conclude the customer will be at work by 7:15 AM and schedule an SMS shortly thereafter. However, if the system examines the calendar and determines that the customer has a 7:15 AM meeting, the system may opt to send the message as an email message.

All messages sent and received are tracked by the SVS for analytics. The analytics results are used to tune rules, identify new data for use, identify new context for use, update message generation hints and to influence schedule delivery times.

Figure 6:
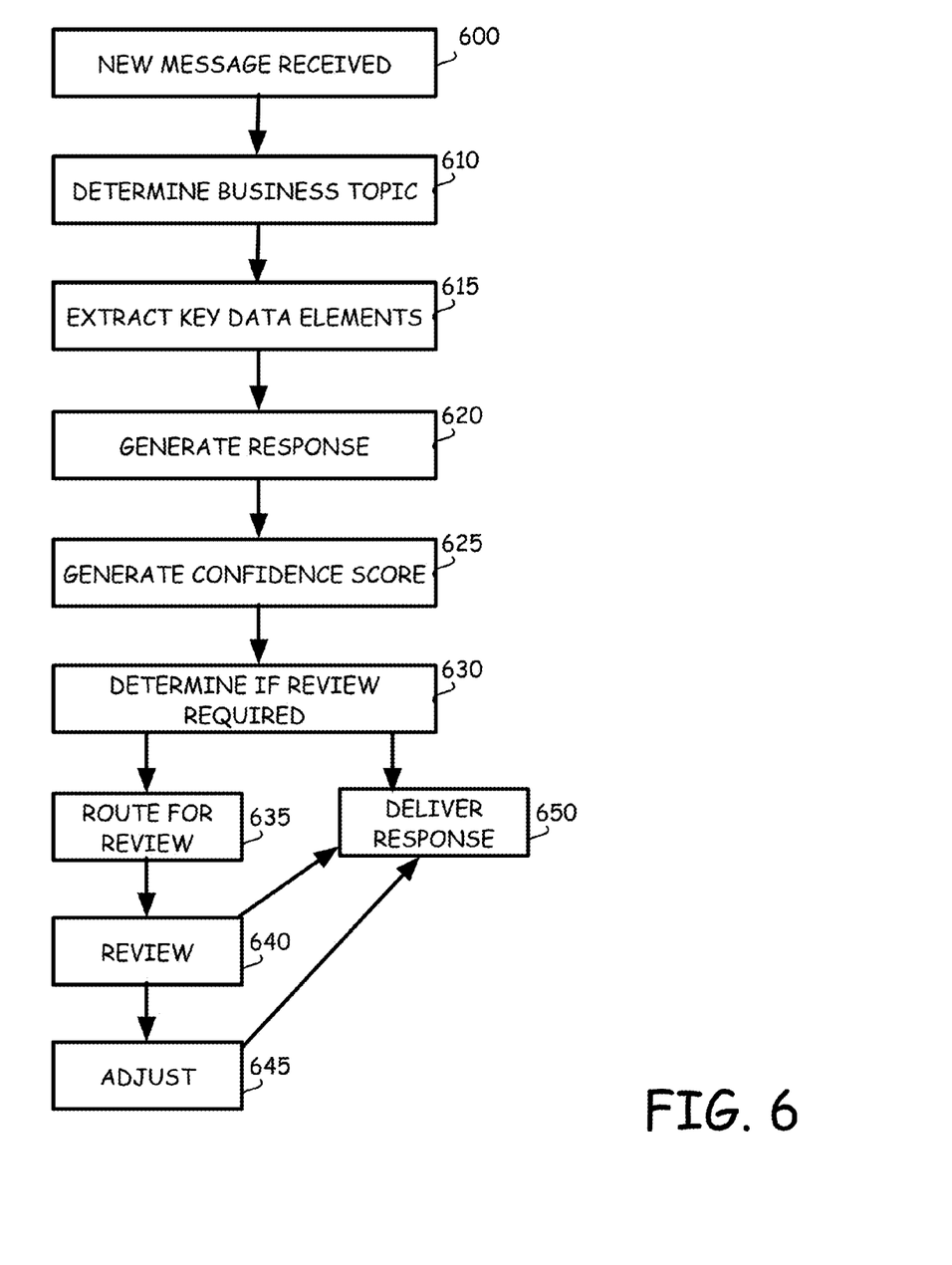
FIG. 6 is a flow diagram illustrating exemplary actions for handling an inbound message.

FIG. 6 is a flow diagram illustrating exemplary actions for handling an inbound message. Initially, a new message is received 600. The message could be received from a customer, an operator, a worker or the message generator. The SVS then operates to determine the business topic 610 of the message. The SVS can utilize natural language process techniques to determine the business topic of the message. In some embodiments, a set or subset of the tools available within IBM's WATSON can be utilized to perform the natural language processing and related ML work. If the message is received through a voice application, the message can be converted from speech to text prior to further processing. The responses may be generated in text and converted to speech if the channel mandates it. The business topic may be determined by the various factors. A few non-limiting factors may include identifying keywords in the message (text) entities referenced in the message, intent expressed in the text, the date receive, the day of the week received, the time of day received, previous message exchanges between the SVS and the customer, the current status of the customer, the location of the customer and the location of a fleet vehicle assigned to the customer.

After the business topic of the message is determined, the SVS may use natural language processing techniques to extract keywords and data elements from the message 615. As previously mentioned, the keywords, as well as other factors are utilized in identifying the business topic of the message. Identifying the business topic of the message allows the SVS to determine how to process the message. For instance, as a non-limiting example, the SVS determines if the message applies to one or more of the following business topics:

A customer flip request
A response to a campaign/prompt
A customer flip rating or feedback
Account management of the customers account, such as adding a new driver to the account, updating the payment method (add a new or change a card number) or general questions about the service, new preferences, etc.
An incident report
General questions regarding a vehicle
Operationally related such as flip logistics (for instance this may invoke a direct connect between the customer and dispatch or a concierge performing the flip), changing of time and/or location to receive vehicle, etc.

Having knowledge of the business topic and the key data elements, the SVS may then generate a response to the original inbound message 620. The response may typically utilize the business topic, keywords and entities extracted in the previous processes, combined with a knowledge base build up from previous conversations, prior transactions and telematics data and some real time operation metrics that reflect availability of finite resources like vehicles, labor to perform flips, anticipated future flips by this customer and other customers of the SVS and expected destination of the customer and location of other customers, etc.

A confidence score is then generated pertaining to the generated message 625. The confidence score can be generated in a variety of manners, including but not limited to, selecting pre-constructed responses from a list of responses based on the business topic, keywords, etc. Further, the response may be a template response that is augmented based on the business topic, keywords, etc. Further, the response may be built from scratch if no pre-constructed messages or templates are relevant given the business topic, keywords, etc. The response may be run through the same logic as the original message to determine the business topic and keywords of the response. The confidence score can be calculated by comparing the business topics and keywords of the original message and the response. For example, if the business topic of the original message is determined to be a flip request but, the business topic of the response is an information request, this may generate a lower confidence score than a response business topic that includes a vehicle suggestion. Further, the SVS may include a keyword mapping that is used to generate a confidence score. For example, if the original message included the keyword VACATION, the response may include the keyword/phrases INTENDED DESTINATION and TRAVEL DATES. Such a pairing may generate a high confidence score, whereas the absence of such keyword/phrase may generate a lower confidence score. However, the confidence score may be further augmented based on examination of other information sources. For instance, the confidence score could be augmented based on calendar information indicating that the customer is going to Florida on a particular date. Thus, in this example the absence of those keyword/phrases would not adversely affect the confidence score.

The confidence score is a tool that is used to measure the systems understanding of both the needs of the customer and the state or activity of the customer. As such, in addition to the previously described information, the confidence score can also include an analysis of information data obtained directly from the member, such as prior interactions or communications between the system and the customer, swap transactions, etc. Further, the generation of the confidence score may also incorporate information and data obtained from a telematics device that is associated with a particular vehicle that is in the possession of the customer. Also evidence of needs or state of a customer can be determined or estimated by examining the schedule or calendar of a customer, as well as other sources such as social media or other third party software that supports their lifestyle. In addition, the location and usage of a customer's own smartphone can also be used to obtain needs, state or scheduling information pertaining to a user.

It should be appreciated that the role of the telematics device within vehicles can be used to provide a variety of information in many of the various actions and operations of the various embodiments and not just in the generation of a confidence score. The data collected from the telematics device addresses the customer's needs by enabling the system to observe usage patterns. As a few non-limiting examples, the usage patterns may include identifying the frequency that a customer travels to a particular location, identify if a customer has changed work locations, determining how aggressively a customer drives, determining how often a customer drives, determining how far a customer typically drives, determining that the average number of miles driven by the customer over a certain period of time has increased relative to the number of miles driven by the customer over a previous period of time, etc.

Further, the data collected from the telematics device addresses the customer's state by enabling the system to observe current activity of the customer. As a few non-limiting examples, the telematics information can identify the current state by allowing the system to determine if the customer is currently driving, if the customer is out of town, if the vehicle in the possession of the customer is malfunctioning, if the customer has taken up a hobby indicated by traveling to a particular location frequently (i.e. golf course), if the present state is associated with a return to a geographical zone defining a home location, etc.

If the confidence score is below a particular threshold, the SVS may trigger the response for review 630. In such cases, the response may be sent to an operator or worker for review 640. The operator or worker and review the response in view of the original message and either deliver the response 650, or adjust the response 645 and then deliver the response 650. If the confidence score is satisfactory 630, then the SVS may send the response 650.

The response may be designed to provide necessary/ requested information to a customer and, it may also be designed to use the opportunity to obtain further information. For instance, in the example above, the response may include a message indicating that the SVS believes the customer is going to Florida on a particular date and then ask the customer if the customer will be taking any family members, pets, or equipment. Further, the response may request a return date as well as determine if the customer will require the same vehicle for the return trip. Such responses will engage the customer in a conversation from which the SVS can obtain more information about the customer and this particular transaction.

The following example is a simple illustration of a typical message processed by the SVS:

(a) new inbound message: Hey, can I setup a flip for a night out this weekend?

(b) Business Topic: Flip Request (c) Key data elements: Recipe=night out, day=Friday, Saturday, Sunday (d) Generate Response: Yes, we can help you get ready for a night out, what day on the weekend do you prefer?

(e) Confidence Score: 88.89

(f) no review necessary, deliver message and schedule follow up message to ensure response to prompt is received.

(g) receive new inbound message from customer: Friday (cancel scheduled message)

(h) Business Topic: Flip request based on prior message (i) Key data elements: day=Friday (j) Generate response: Yes, Friday is good, what time on Friday would be good and where would you like the delivery to occur? Have you enjoyed the Ford Fusion?

(k) Confidence Score: 85

(l) no review necessary, deliver message and schedule followup message to ensure response to prompt is received (m) receive new inbound message from customer: 5:00 PM at home, loved it (n) Business Topic Flip based on prior messages, Feedback based on prompt (o) Key Data Elements: Time: 5:00 PM, Location: Home, Feedback: Ford Fusion—Loved (p) Confidence Score: 94.56

(q) Generate Response: Deliver schedule (r) Update data, Ford Fusion=high satisfaction level (s) No review necessary, deliver message.

As a more general example, if the use case is determined to be a flip request 610, the system may include in its evaluation, a comparison against defined use cases. As previously described, the SVS can maintain a view of the use cases for individual customers as well as general use cases for all or a group of customers. When a business topic, such as a flip is identified, the parametric values included in the flip can be analyzed can compared against the defined or existing use cases. If a use case is found that matches or substantially matches the flip request, a high confidence level can be attributed to the SVS response generated following the flip request. However, if a use case is not found that substantially matches the flip request, the closest use cases can be evaluated. Common elements between the closest use cases can be identified and the SVS may use additional information to differentiate the closest use cases in an attempt to find the best match. The additional information may include a query to the customer, a review of previous correspondences/conversations with the customer, review of historical activity of the customer and/or similarly situated customers, etc. If this campaign is successful in eliminating other use cases as one "best fit" emerges, then the system may generate a response to the flip request based on this information. On the other hand, if the use cases are substantially dissimilar to the flip request, the SVS may respond by creating a new use case and taking any or all of the above-identified actions to obtain information to build and define this use case.

As previously stated, engaging in ongoing communications with a customer is desired for the SVS to gather additional information. Customer requests are one mechanism that can be used to trigger the entrance into a conversation with the customer. Similarly, other activity may also result in triggering the initiation or continuation of a conversation with the customer. For instance, if a change is made to the fleet status 260, this information may result in the event processor 260 triggering an event. As a non-limiting example, if the fleet is expanded, the SVS could generate a message to one or more customer to notify them of the additional vehicles and request feedback from the customer(s) regarding their interest in these vehicles. In addition, if the SVS has not received a request from a customer after a particular period of time, the SVS may generate a message to the customer to inquire as to potential future swaps. As another example, the SVS may scrape calendar information of a customer and inquire as to a potential flip pertaining to an item on the customer's calendar, such as a vacation, business trip, anniversary, etc. The SVS may include a period timer, or a random or pseudo random timer that may be used to trigger events to contact the customer. Thus, these and other actions can be employed by the SVS to keep the conversation between the customer and the SVS active.

As presented in FIG. 4, the fleet vehicles may include a telematics device. The SVS may receive information from the telematics device while the vehicle is in a customer's possession. This information can be utilized to generate message inquiries to the customer. For instance, if the customer is a conservative driver, the SVS could generate messages to the customer regarding the availability of vehicles with high safety ratings, good gas mileage, etc. Likewise, if the telematics indicate that the customer is an aggressive driver, the SVS may generate a message to inquire as to the customer's desire for a sporty car with great acceleration. Further, the telematics may be utilized to determine changes in a customer's driving habits. For instance, the telematics may reveal that a customer has moved and as such, the SVS may generate an inquiry regarding the customer's current address. Likewise, the telematics may indicate that the customer has changed jobs, has increased or decreased the amount of daily driving, etc. The message generation function 510 can use this information as a seed to generate a variety of messages for the customer aimed at gather further information and changing the customer's profile accordingly.

The SVS may periodically review a customer's profile to identify missing information and then schedule messages to the customer in an attempt to solicit data for the missing information. These messages may be spread out over time to prevent overwhelming the customer with a request for a large amount of information at one time. Likewise, the SVS may schedule customer inquiries at times that the customer has tended to be more responsive, such as after working hours, weekends, vacations, business trips, etc.

The SVS may also trigger communications to one or more customers based on operational constraints, fleet inventory and delivery availability. For instance, during slow periods of time, the SVS may generate messages in an attempt to encourage customers to request flips. Likewise, if the fleet inventory does not have particular vehicles available based on anticipated flips, the SVS may generate messages to the customers that currently have the desired vehicles in an attempt to encourage them to request a flip.

The SVS may implement a variety of state machines focused on initiating conversations with a customer or following up with a customer. The state machines may be on a customer level, class of customers, or even system wide. For instance, in response to receiving a flip request, a post-flip state may be entered. In the post-flip state, the message generation function 510 may pool from a particular set of data, context and rules in generating messages. After a period of time without receiving a flip request, the message generation function 510 may enter into a idle state indicating that the customer has not been active for a period of time. In the idle state, the message generation function 510 may pull from a different set of data, context and rules in generating messages. Looking at a system wide example, the fleet may be represented in a state diagram. As such, if a shortage of a particular class of vehicle is detected, the message generation function 510 may enter into a state that initiates a campaign to encourage customers that currently possess that particular class of vehicle to request flips.

It should be appreciated that each message generated by the SVS that results in a customer response can be fed through the flow of FIG. 5 to generate a follow up message and thus, each triggering event in essence, can result in the initiation of a conversation that may include multiple messages and responses.

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in the art of programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer readable medium. Computer-readable media comprise both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for a computer system implementing a subscription vehicle service to maintain a communication with a customer in an effort to solicit and collect further information to apply artificial intelligence in refining the services provided to the customer in generating a vehicle suggestion, the method comprising:
   receiving an electronic customer message at the computer system, wherein the customer is associated with the subscription vehicle service;
   receiving telematics data from one or more vehicles that have been used by the customer in the past;
   the computer system analyzing the message to identify one or more business topics to which the received message relates;

the computer system identifying key data elements in the message;

the computer system automatically generating a response message to be sent to the customer, the response message including statements that are selected through the application of artificial intelligence based on the business topics and key data elements that the computer system identified in the electronic message;

the computer system analyzing the automatically generated response message to generate a confidence score for the response message, wherein the confidence score is based on the customer's needs and present state inferred from prior data collected by the computer system from the customer, data generated by one or more telematics devices comprised within a vehicle asset associated with the customer, and the business topics and keywords in the statements of the automatically generated response;

if the confidence score is above a first threshold value, the computer system delivering the automatically generated response message to the customer; and if the confidence score is below a second threshold value, the computer system initiating a review of the automatically generated response message and the computer system adjusting the automatically generated response message and continuing at the analyzing the automatically generated response message step;

wherein the process is repeated until the computer system generates and delivers an automatically generated response to the customer.

2. The method of claim 1, wherein the action of generating a response message further comprises the computer system applying artificial intelligence in selecting one or more message components from a set of message components that are related to the business topic and one or more of the identified key data elements.

3. The method of claim 1, wherein each customer is associated with a customer profile and the action of generating a response message further comprises: the computer system selecting a message template from a set of message templates that are related to the business topic and one or more of the identified key data elements and completing the template with information selected from one or more sources including the customer profile, prior messages and telematics data.

4. The method of claim 1, further comprising generating a conversation initiation message by the computer system in response to received data from the telematics device indicating the customer's present state and wherein the electronic customer message is received in response to the conversation initiation message.

5. The method of claim 4, wherein the received data from the telematics device indicates that the customer's present state is associated with a return to a geographical zone defining a home location.

6. The method of claim 4, wherein the received data from the telematics device indicates that the average number of miles driven by the customer over a certain period of time has increased relative to the number of miles driven by the customer over a previous period of time.

7. The method of claim 1, further comprising generating a conversation initiation message by the computer system in response to a recognition that no prior customer message has been received by the computer system over a certain period of time and wherein the electronic customer message is received in response to the conversation initiation message.

8. The method of claim 1, further comprising generating a conversation initiation message by the computer system in response to a change in the makeup of a fleet of vehicle assets associated with the vehicle subscription service and wherein the electronic customer message is received in response to the conversation initiation message.

9. The method of claim 1, further comprising generating a conversation initiation message by the computer system in response to a change in a scheduling software associated with the customer and monitored by the computer system and wherein the electronic customer message is received in response to the conversation initiation message.

10. The method of claim 1, further comprising generating a conversation initiation message by the computer system in response to requests from other customers for particular vehicle assets associated with the subscription vehicle service and wherein the electronic customer message is received in response to the conversation initiation message.

11. A computer system implementing a subscription vehicle service and that maintains communication with a customer in an effort to solicit and collect information to apply artificial intelligence in refining the services provided to the customer in generating a vehicle suggestion, the system comprising:

a user interface for receiving electronic customer messages, a response message generation module, and a database comprising a set of rules and data, collectively configured to:

receive an electronic customer message at the computer system, wherein the customer is associated with a subscription vehicle service;

receive telematics data from one or more vehicles that have been used by the customer in the past;

analyze the customer message to identify one or more business topics to which the received customer message relates;

identify key data elements in the customer message;

based on the business topics and the key data elements, generate a response message to be sent to the customer, wherein the response message includes statements that are selected through the application of artificial intelligence based on the business topics and key data elements that the computer system identified in the customer message;

analyze the response message to generate a confidence score for the response message, wherein the confidence score is based on the customer's needs and present state inferred from prior data collected by the computer system from the customer, data generated by and one or more telematics devices comprised within a vehicle asset associated with the customer, and the business topics and keywords within the statements of the response message;

if the confidence score is above a first threshold value, deliver the response message to the customer; and if the confidence score is below a second threshold value, initiate a review of the response message and adjust the response message and continuing to analyze the response message until the response message is sent to the customer; and continuing to engage the customer with a conversation through artificial intelligence until a vehicle suggestion is accepted by the customer.

12. The computer system of claim 11, wherein the action of generating a response message further comprises selecting one or more message components from a set of message components that are related to the business topic and one or more of the identified key data elements.

13. The computer system of claim 11, wherein each customer is associated with a customer profile and the action of generating a response message further comprises: selecting a message template from a set of message templates that are related to the business topic and one or more of the identified key data elements and completing the template with information selected from one or more sources including the customer profile, prior messages and telematics data.

14. The computer system of claim 11, wherein the computer system is further configured to generate a conversation initiation message in response to received data from the telematics device indicating the customer's present state and wherein the customer message is received in response to the conversation initiation message.

15. The computer system of claim 14, wherein the received data from the telematics device indicates that the customer's present state is associated with a return to a geographical zone defining a home location.

16. The computer system of claim 14, wherein the received data from the telematics device indicates that the average number of miles driven by the customer over a certain period of time has increased relative to the number of miles driven by the customer over a previous period of time.

17. The computer system of claim 11, wherein the computer system is further configured to generate a conversation initiation message in response to a recognition that no prior customer message has been received by the computer system over a certain period of time and wherein the customer message is received in response to the conversation initiation message.

18. The computer system of claim 11, wherein the computer system is further configured to generate a conversation initiation message in response to a change in the makeup of a fleet of vehicle assets associated with the vehicle subscription service and wherein the customer message is received in response to the conversation initiation message.

19. The computer system of claim 11, wherein the computer system is further configured to generate a conversation initiation message in response to a change in a scheduling software associated with the customer and monitored by the computer system and wherein the customer message is received in response to the conversation initiation message.

20. The computer system of claim 11, wherein the computer system is further configured to generate a conversation initiation message in response to requests from other customers for particular vehicle assets associated with the subscription vehicle service and wherein the customer message is received in response to the conversation initiation message.

* * * * *